Sept. 16, 1952        A. VALENTIN        2,611,122
DYNAMOELECTRIC MACHINE
Filed June 15, 1948
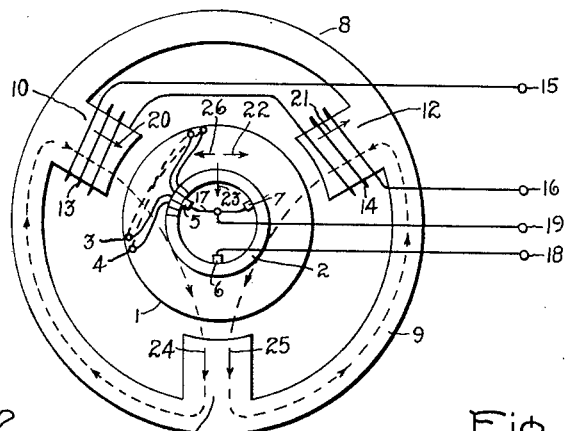
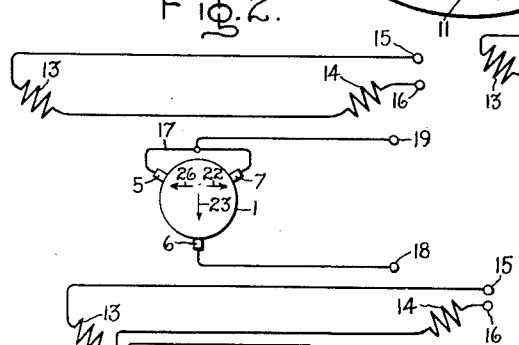
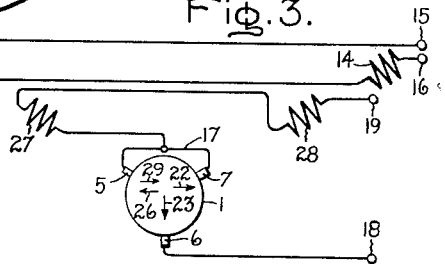
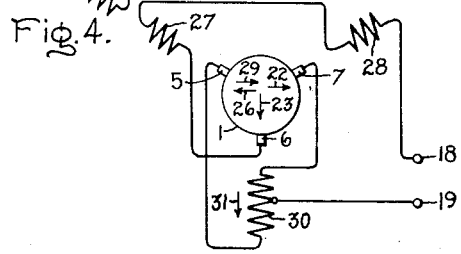
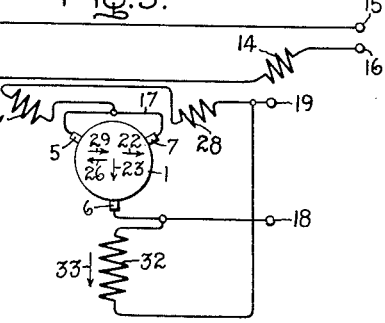
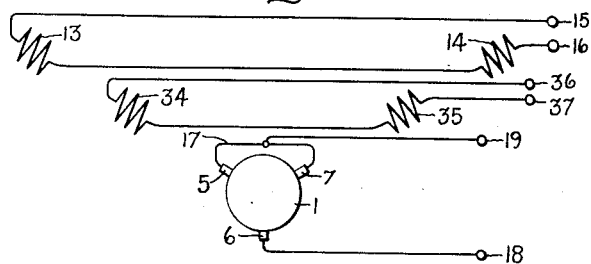
Inventor:
Andre Valentin,
by *Brownell S. Mack*
His Attorney.

Patented Sept. 16, 1952

2,611,122

UNITED STATES PATENT OFFICE 2,611,122

DYNAMOELECTRIC MACHINE

André Valentin, Belfort, France, assignor to General Electric Company, a corporation of New York Application June 15, 1948, Serial No. 33,047
In France July 18, 1947

23 Claims. (Cl. 322—53)

1

This invention relates to commutating type dynamoelectric machines and more particularly to such machines wherein the armature reaction provides a major source of excitation.

A dynamoelectric machine of the armature reaction excited variety normally comprises a rotor or armature having a winding formed with coils connected to a commutator of the type used on conventional direct current machines. The major component of excitation in this type of machine is provided by the armature reaction flux produced by current flowing in the armature winding. To facilitate the production of this armature reaction, a plurality of mutually displaced brushes is provided, at least two of these brushes being joined by a low resistance connection amounting essentially to a short-circuit. These brushes with their low resistance connection provide a primary circuit through the armature for the current which produces the exciting armature reaction. Other brushes provide a secondary circuit through the armature and are connected to a load circuit when the machine is used as a generator or to a power supply circuit when it is used as a motor.

The stationary member of a machine of this type is arranged to provide a path of low magnetic reluctance for the various magnetic fluxes set up by the armature current, and is provided with various windings to improve or control the operation of the machine. These stator windings include an exciting or control winding for inducing the voltage in the primary or quadrature armature circuit which produces the heavy flow of current therein due to the low resistance path between the brushes. This heavy flow of current in the primary armature circuit in turn produces the desired main field, primary armature reaction flux. In the most effective construction, a compensating winding is provided to neutralize substantially the armature reaction attributable to the current flowing in the secondary armature circuit to the load when the machine is used as a generator or from a power source when it is used as a motor. With such an arrangement, an armature reaction excited dynamoelectric machine, used as a generator, can be made by appropriate design of the various circuits to provide a variable voltage or variable current output with rapid response to adjustment of the control field excitation and a very high amplification ratio between the change in output and the change in input to the control field. Furthermore, when this type

2 of machine is used as a motor, the control field gives especially accurate control of speed with low energy input and the machine is thus adaptable for use with a simple low energy speed regulation system. The basic principles of armature reaction excited dynamoelectric machines are illustrated and described in Patent 2,227,992 to Ernst F. W. Alexanderson and Martin A. Edwards, assigned to the assignee of the patent application.

In the past, armature reaction excited dynamoelectric machines have customarily been of the bi-polar type with four polar projections and two sets of mutually displaced brushes. I have found that it is possible to construct an armature reaction excited dynamoelectric machine with three polar projections and three brushes.

An object of this invention is to provide an improved dynamoelectric machine of the armature reaction excited type.

Another object of this invention is to provide an improved armature reaction excited dynamoelectric machine having three polar projections and three brushes.

Further objects and advantages of this invention will become apparent and the invention will be better understood from the following description referring to the accompanying drawing. The features of novelty which characterize this invention will be pointed out with particularity in the claims annexed to and forming a part of this specification.

In the accompanying drawing, Fig. 1 illustrates the arrangement of field exciting windings, polar projections, and brushes in one embodiment of this invention; Fig. 2 is a schematic illustration of the embodiment of Fig. 1; Fig. 3 illustrates schematically a modification of this improved armature reaction excited dynamoelectric machine providing compensation of secondary armature reaction; Figs. 4 and 5 illustrate further modifications of this improved dynamoelectric machine providing additional quadrature excitation to augment the primary armature reaction; and Fig. 6 illustrates the use of a plurality of control fields in an armature reaction excited dynamoelectric machine of the type contemplated by this invention.

In accordance with this invention, there is provided a field member having three polar projections mounted substantially 120° apart and an armature having an overlapping winding with a substantially 120° pitch. The armature is connected to a conventional commutator which is contacted by three brushes electrically displaced from each other by substantially 120°. Two of the brushes are joined by a low resistance connection to provide the primary circuit through the armature and the secondary or load terminals of the machine are respectively connected to the third brush and the low resistance connection between the two primary brushes.

Referring now to Fig. 1 there is shown an armature reaction excited dynamoelectric machine constructed in accordance with this invention and provided with a rotatable member or armature 1 having a commutator 2 of the conventional direct current type, connected to a substantially 120° pitch armature winding, two coils of which are shown at 3 and 4. The commutator 2 is contacted by brushes 5, 6 and 7 equally displaced from each other by substantially 120°. These brushes are shown here, for the purpose of clarity in illustration, as bearing on the inside surface of the commutator, however, it is to be understood that they actually contact the commutator in the conventional manner. Surrounding the armature member 1, is a field member 8 having a yoke portion 9 and three equally spaced polar projections 10, 11 and 12. Control field exciting windings 13 and 14 are arranged on the polar projections 10 and 12 and are connected in series for excitation by an external source (not shown) from terminals 15 and 16. A low resistance connection 17 interconnects brushes 5 and 7 to provide a low resistance primary or quadrature circuit through the armature 1. The third brush 6 provides with the primary brushes 5 and 7, a secondary circuit through the armature, and secondary terminals 18 and 19, to which a load or an external source of power is connected, are respectively connected to the third brush 6 and the low resistance connector 17.

Assuming that the machine of Fig. 1 is operated as a generator and is driven by an external source of mechanical power (not shown), energization of the control field exciting windings 13 and 14 will cause the circulation of field flux in the direction of the arrows 20 and 21. This produces a resultant excitation in the armature 1 in the direction shown by the arrow 22 and voltages will be generated due to rotation of the armature in the coils 3 and 4 located under the polar projection 10 and in the corresponding coils under the polar projection 12. Thus, there is a maximum difference in generated voltage between the brushes 5 and 7 and since these brushes are connected by the low resistance connection 17, a heavy current will flow through the primary armature circuit.

Since the primary brushes 5 and 7 are short-circuited, it will be apparent that only a very small amount of flux need be provided by the control field exciting windings 13 and 14 in order to induce a voltage between these brushes to build up a relatively large primary current through that part of the armature winding which is connected between these brushes. This primary current will produce a magnetic flux or primary armature reaction along the axis indicated by the arrow 23. This primary armature reaction produces lines of flux through the armature 1 and the field member 8 as shown by the arrows 24 and 25. As the armature 1 rotates the conductors connected between the brushes 5 and 6, and 7 and 6 will cut the primary armature reaction flux. Thus, a generated voltage is produced between the brushes 5 and 6 and 7 and 6, and since brushes 5 and 7 are interconnected by the low resistance connection 17, and the third brush 6 and the connector 17 are respectively connected to secondary terminals 18 and 19, it can be readily seen that the voltage generated between the brushes 5 and 6, and 7 and 6 will appear across the secondary terminals.

As explained above, only a very small amount of flux need be provided by the control field exciting windings 13 and 14 to build up a large current flow through the primary brushes 5 and 7. Therefore, it can be readily seen that the secondary characteristics or output voltage of the generator can be controlled by the feeble magnetic excitation provided by the control field exciting windings 13 and 14 which produce the main field or primary armature reaction flux. It will be noted that the excitation produced by the control field exciting windings, shown by the arrow 22 is in an axis at right angles to the axis of the primary armature reaction flux 23, the former axis being referred to as the secondary axis of the machine.

If a load is connected to the secondary terminals 18 and 19, a secondary or load current will flow through the armature coils connected between brushes 5 and 6, and 7 and 6. This flow of secondary or load current through the secondary armature circuit produces a secondary armature reaction in the direction indicated by the arrow 26. It will be readily seen that this secondary armature reaction is in the secondary axis of the machine along with the excitation 22 produced by the control field exciting windings 13 and 14. In the case of a generator, as shown here, the excitation provided by the control field exciting windings opposes the secondary armature reaction, while in a motor the secondary armature reaction and the control field excitation are cumulative. In the embodiments of Figs. 1 and 2, used as a generator, as the load is increased, a drooping voltage characteristic will result and it is necessary to increase the ampere-turns on the polar projections 10 and 12 to provide for heavier output.

As shown above, the secondary armature reaction is in the same axis as the control field excitation and may, therefore, over-ride and destroy the effect of the control field. In order to provide a stable generator which is controllable by the minimum amount of control field excitation, it is essential that this secondary armature reaction be substantially neutralized. Referring now to Fig. 3, in which like elements are indicated by like reference numerals, there is shown an armature reaction excited dynamoelectric machine similar to that shown in Figs. 1 and 2, with the additional provision of means for neutralizing the secondary armature reaction 26. Here, there is provided an armature 1 with a pair of primary brushes 5 and 7 electrically spaced apart by substantially 120° and a third brush 6 also displaced from the primary brushes 5 and 7 by substantially 120°. As described above, the primary brushes 5 and 7 provide a primary circuit through the armature 1 while the third brush 6 provides with the primary brushes 5 and 7 a secondary circuit through the armature. Assuming that the embodiment of Fig. 3 is operated as a generator, field exciting winding 13 and 14 energized from terminals 15 and 16 will produce an excitation in the armature indicated by the arrow 22. This excitation produces a generated voltage between the primary brushes 5 and 7 and, since these brushes are short-circuited by the low resistance connection 17, a heavy flow of current through the primary armature circuit will result. This heavy flow of primary armature current produces a primary armature reaction shown by the arrow 23 which in turn produces a generated voltage across the brushes 5 and 6, and 7 and 6. As pointed out above, if the third brush 6 and the connection 17 are connected to secondary terminals 18 and 19 and a load connected thereto, there will be a resultant flow of secondary current through the armature which produces a secondary armature reaction shown by the arrow 26. This secondary armature reaction opposes the primary excitation flux 22 and thus decreases the effectiveness of the field exciting windings 13 and 14. In order to substantially neutralize this secondary armature reaction, the arrangement now to be described is provided.

Additional field exciting windings 27 and 28 are positioned on polar projections 10 and 12, along with the control field exciting windings 13 and 14, and are arranged in series with the connection between the low resistance connector 17 and the secondary terminal 19. These windings produce a component of excitation along the secondary commutating axis as indicated by the arrow 29. Since the load current flows through the compensating field exciting windings 27 and 28, the excitation produced thereby is proportional to this current, as is the secondary armature reaction 26. Therefore, it can be readily seen that when the correct number of turns are provided on the compensating field exciting windings 27 and 28, the compensating excitation 29 and secondary armature reaction 26 may be made to exactly cancel out, and heavy load currents may be carried by the secondary armature current without affecting the excitation produced by the control field exciting windings. With this secondary armature reaction compensating system functioning properly, the control field exciting windings 13 and 14 are only required to supply a relatively small amount of excitation and may consequently be designed for a very low current input and a low ratio of inductance to resistance thereby increasing the speed of response and sensitivity of control. Thus an armature reaction excited generator can be made to have a high amplification factor since a relatively small amount of power is required for the control field exciting winding and the machine inherently has a high rate of response.

In the embodiments shown in Figs. 1, 2 and 3, the entire operating main field flux is provided by the primary armature reaction produced by the current flowing in the primary armature circuit by virtue of the low resistance connection between the primary brushes 5 and 7. It may be desirable to provide additional main field flux to augment the primary armature reaction, however, this additional excitation should be responsive to the current flowing in the primary armature circuit in order to retain the desirable amplification characteristics of this type of dynamoelectric machine. Referring now to Fig. 4 in which like elements are indicated by like reference numerals, there is shown another embodiment of this invention in which an additional source of main field excitation is provided to augment the primary armature reaction. Here, there is provided an armature reaction dynamoelectric machine having an armature member 1 with a pair of primary brushes 5 and 7 electrically spaced apart by substantially 120° and a third brush 6 also displaced from the primary brushes by substantially 120°. The primary brushes 5 and 7 provide a primary circuit through the armature 1 and the third brush 6 provides with the primary brushes 5 and 7 a secondary circuit through the armature. Control field exciting windings 13 and 14 energized from terminals 15 and 16 produce an excitation in the armature indicated by the arrow 22. As thus far described, this embodiment is similar to that shown in Figs. 1 and 2. However, this embodiment contemplates not only means for neutralizing secondary armature reaction as described above but also means for producing additional excitation in the same axis as the primary armature reaction. In Figs. 1, 2 and 3, a low resistance connection 17 was interposed between primary brushes 5 and 7 to complete the primary circuit and to permit the flow of heavy primary armature current for producing the primary armature reaction. Here, another field exciting winding 30 is positioned on polar projection 11 and is interposed in series between the primary brushes 5 and 7. This winding is still, in essence, a low resistance connection between the primary brushes, however, the flow of primary armature current therethrough produces excitation in the axis of the primary armature reaction 23, shown here by the arrow 31. Thus, an additional component of main field excitation is provided which is proportional and responsive to the primary armature current and is in the same axis with and augments the primary armature reaction flux. In this embodiment, while the secondary terminal 18 is still connected to the third brush 6 the other secondary terminal 19 is connected to the midpoint of the field exciting winding 30. It can be readily seen that the flow of load current from the primary brushes 5 and 7 to the secondary terminal 19 will not affect the excitation produced by the field exciting winding 30 since the load current will be divided equally through the two halves of this field exciting winding, thus leaving the short-circuit current between the brushes 5 and 7 the only effective energizing current in the winding. It is, of course, desirable to neutralize the secondary armature reaction, as explained above, and therefore field exciting windings 27 and 28 positioned on polar projections 10 and 12 along with control field exciting windings 13 and 14, are located in series with the connection between the third brush 6 and the secondary terminal 18. These compensating field exciting windings are excited by the secondary load current flowing to the secondary terminal 18 and produce excitation 29 in the axis of the control excitation 22 in opposition to the secondary armature reaction 26.

Referring now to Fig. 5 in which like elements are indicated by like reference numerals, there is shown a further embodiment of this invention wherein the additional excitation augmenting the primary armature reaction is responsive to the terminal voltage of the machine rather than directly responsive to the primary armature current, as in Fig. 4. Here, as in the previous figures, there is provided an armature 1 with primary brushes 5 and 7, a third brush 6, and control field exciting windings 13 and 14 energized from terminals 15 and 16. Primary brushes 5 and 7 are connected by the low resistance connection 17 to provide the primary armature circuit, and brush 6 and the connector 17 are respectively connected to primary terminals 18 and 19 to provide the secondary circuit through the machine. As described above, control field exciting windings 13 and 14 produce excitation 22 in the armature 1 and, by virtue of the short-circuited connection 17 between the primary brushes 5 and 7, produce a heavy flow of primary armature current in turn producing the primary armature reaction 23. This primary armature reaction provides the main field flux which is cut by the armature conductors connected between brushes 5 and 6, and 7 and 6 generating the output voltage which appears across the secondary terminals 18 and 19. In order to provide an additional source of excitation to augment the primary armature reaction 23, field exciting winding 32 is positioned on polar projection 11 and is connected across the primary terminals 18 and 19. This winding is, therefore, excited responsive to the voltage across the terminals 18 and 19 and produces excitation in the axis of the primary armature reaction 23, indicated by the arrow 33, shown here as augmenting the primary armature reaction 23. As in Figs. 3 and 4, the secondary armature reaction 26 is neutralized by compensating field exciting windings 27 and 28, positioned on polar projections 10 and 12, together with control field exciting windings 13 and 14, and arranged in series between the low resistance connector 17 and the terminal 19. The compensating field exciting windings 27 and 28 are energized by the load current flowing to the terminals 19 and produce excitation 29 in the axis of the secondary armature reaction 26 and opposed thereto.

With reference to both Figs. 4 and 5, it will be readily apparent that the excitation produced by the field exciting windings 30 and 32 respectively can be arranged to buck rather than assist the primary armature reaction 23 if such a characteristic is desired. Furthermore, it may be found desirable to provide an armature reaction excited dynamoelectric machine with additional excitation in the axis of the primary armature reaction, as shown in Figs. 4 and 5, but without compensating for the secondary armature reaction. In this event, compensating field exciting windings 27 and 28 are merely eliminated.

It is well known in the art that an armature reaction excited dynamoelectric machine can be provided with a number of control field exciting windings to produce the desired characteristics. In Fig. 6, there is shown a modification of Figs. 1 and 2 in which a second pair of control field exciting windings 34 and 35, excited from an external source through terminals 36 and 37, are positioned on polar projections 10 and 12 together with control field excited windings 13 and 14. The additional control field exciting windings 34 and 35 may be arranged for differential excitation in conjunction with control field exciting windings 13 and 14, or may be excited in response to some external source totally unrelated to the excitation of the control field exciting windings 13 and 14.

It will now be readily apparent that all of the known circuit arrangements for armature reaction excited dynamoelectric machines may be used on machines constructed in accordance with this invention, the various arrangements shown here being only illustrative of the possible utilization of a machine of this type. To summarize, the present invention contemplates an armature reaction excited dynamoelectric machine in which the field member comprises three equally spaced polar projections, the armature is provided with an overlapping winding with a substantially 120° pitch, and the commutator is contacted by three brushes electrically spaced apart by 120°, two of the brushes being connected together by a low resistance connection and the output being connected between the third brush and the low resistance connector. It will be readily seen that this invention provides an armature reaction excited dynamoelectric machine having only three polar projections and three brushes, thus simplifying the construction and permitting more space for field exciting windings in the same frame size machine.

While I have illustrated particular embodiments of this invention, further embodiments will occur to those skilled in the art. I desire that it be understood, therefore, that this invention is not limited to the specific embodiments shown and I intend in the appended claims to cover all modifications consistent with the spirit and scope of this invention.

What I claim as new and desire to secure by Letters Patent of the United States is:

1. An armature reaction excited dynamoelectric machine having a field member and an armature member provided with a commutator, three brushes including a pair of primary brushes electrically spaced apart and providing a primary circuit through said armature, said primary brushes being interconnected by a low resistance connection, the third of said brushes being electrically displaced from said pair of primary brushes and providing with said pair of primary brushes a secondary circuit through said armature, and means for controlling the secondary characteristics of said machine including a field exciting winding arranged to provide excitation in the axis of the armature reaction produced by current flowing in said secondary armature circuit.

2. An armature reaction excited dynamoelectric machine having a field member and an armature member provided with a commutator having a 120° winding, three brushes including a pair of primary brushes electrically spaced apart substantially 120° and providing a primary circuit through said armature, said primary brushes being interconnected by a low resistance connection, the third of said brushes being electrically displaced from said pair of primary brushes by substantially 120° and providing with said pair of primary brushes a secondary circuit through said armature, and means for controlling the secondary characteristics of said machine including a field exciting winding arranged to provide excitation in the axis of the armature reaction produced by current flowing in said secondary armature circuit.

3. An armature reaction excited dynamoelectric machine having a field member with three polar projections and an armature member provided with a commutator, three brushes including a pair of primary brushes electrically spaced apart and providing a primary circuit through said armature, said primary brushes being interconnected by a low resistance connection, the third of said brushes being electrically displaced from said pair of primary brushes and providing with said pair of primary brushes a secondary circuit through said armature, and means for controlling the secondary characteristics of said machine including a field exciting winding positioned on two of said polar projections and arranged to provide excitation in the axis of the armature reaction produced by current flowing in said secondary armature circuit.

4. An armature reaction excited dynamoelectric machine having a field member with three equally spaced polar projections and an armature member provided with a commutator having a 120° winding, three brushes including a pair of primary brushes electrically spaced apart substantially 120° and providing a primary circuit through said armature, said primary brushes being interconnected by a low resistance connection, the third of said brushes being electrically displaced from said pair of primary brushes by substantially 120° and providing with said pair of primary brushes a secondary circuit through said armature, and means for controlling the secondary characteristics of said machine including a field exciting winding positioned on two of said polar projections and arranged to provide excitation in the axis of the armature reaction produced by current flowing in said secondary armature circuit.

5. An armature reaction excited dynamoelectric machine having a field member and an armature member provided with a commutator, three brushes including a pair of primary brushes electrically spaced apart and providing a primary circuit through said armature, the third of said brushes being electrically displaced from said pair of primary brushes and providing with said pair of primary brushes a secondary circuit through said armature, means for controlling the secondary characteristics of said machine including a field exciting winding arranged to provide excitation in the axis of the armature reaction produced by current flowing in said secondary armature circuit, and means for neutralizing the armature reaction produced by the current flowing in said secondary armature circuit including a second field exciting winding energized responsive to said current.

6. An armature reaction excited dynamoelectric machine having a field member with three polar projections and an armature member provided with a commutator, three brushes including a pair of primary brushes electrically spaced apart and providing a primary circuit through said armature, the third of said brushes being electrically displaced from said pair of primary brushes and providing with said pair of primary brushes a secondary circuit through said armature, means for controlling the secondary characteristics of said machine including a field exciting winding positioned on two of said polar projections and arranged to provide excitation in the axis of the armature reaction produced by current flowing in said secondary armature circuit, and means for neutralizing the armature reaction produced by the current flowing in said secondary armature circuit including a second field exciting winding positioned on said two polar projections and energized responsive to said current.

7. An armature reaction excited dynamoelectric machine having a field member and an armature member provided with a commutator, three brushes including a pair of primary brushes electrically spaced apart and providing a primary circuit through said armature, the third of said brushes being electrically displaced from said pair of primary brushes and providing with said pair of primary brushes a secondary circuit through said armature, means for connecting said third brush and said primary brushes to a pair of secondary terminals, means for controlling the secondary characteristics of said machine including a field exciting winding arranged to provide excitation in the axis of the armature reaction produced by current flowing in said secondary armature circuit, and means for neutralizing the armature reaction produced by the current flowing in said secondary armature circuit including a second field exciting winding arranged in series with said connecting means and energized responsive to said current.

8. An armature reaction excited dynamoelectric machine having a field member and an armature member provided with a commutator, three brushes including a pair of primary brushes electrically spaced apart and providing a primary circuit through said armature, the third of said brushes being electrically displaced from said pair of primary brushes and providing with said pair of primary brushes a secondary circuit through said armature, means for controlling the secondary characteristics of said machine, means for neutralizing the armature reaction produced by current flowing in the secondary armature circuit of said machine, and means for producing excitation in the axis of the armature reaction produced by current flowing in said primary armature circuit.

9. An armature reaction excited dynamoelectric machine having a field member and an armature member provided with a commutator having a 120° winding, three brushes including a pair of primary brushes electrically spaced apart substantially 120° and providing a primary circuit through said armature, the third of said brushes being electrically displaced from said pair of primary brushes by substantially 120° and providing with said pair of primary brushes a secondary circuit through said armature, means for controlling the secondary characteristics of said machine, means for neutralizing the armature reaction produced by current flowing in the secondary circuit of said machine, and means for producing excitation in the axis of the armature reaction produced by current flowing in said primary armature circuit.

10. An armature reaction excited dynamoelectric machine having a field member and an armature member provided with a commutator, three brushes including a pair of primary brushes electrically spaced apart and providing a primary circuit through said armature, the third of said brushes being electrically displaced from said pair of primary brushes and providing with said pair of primary brushes a secondary circuit through said armature, means for controlling the secondary characteristics of said machine including a field exciting winding adapted to provide excitation in the axis of the armature reaction produced by current flowing in said secondary armature circuit, means for neutralizing the armature reaction produced by the current flowing in said secondary armature circuit including a second field exciting winding energized responsive to said current, and means including a third exciting winding adapted to provide excitation in the axis of the armature reaction produced by current flowing in said primary armature circuit.

11. An armature reaction excited dynamoelectric machine having a field member with three polar projections and an armature member provided with a commutator, three brushes including a pair of primary brushes electrically spaced apart and providing a primary circuit through said armature, the third of said brushes being electrically displaced from said pair of primary brushes and providing with said pair of primary brushes a secondary circuit through said armature, means for controlling the secondary characteristics of said machine including a field exciting winding positioned on two of said polar projections and adapted to provide excitation in the axis of the armature reaction produced by current flowing in said secondary circuit, means for neutralizing the armature reaction produced by the current flowing in said secondary armature circuit including a second field exciting winding positioned on said two polar projections and energized responsive to said current, and means including a third field exciting winding arranged on the third polar projection and adapted to provide excitation in the axis of the armature reaction produced by current flowing in the primary armature circuit.

12. An armature reaction excited dynamoelectric machine having a field member and an armature member provided with a commutator, three brushes including a pair of primary brushes electrically spaced apart and providing a primary circuit through said armature, the third of said brushes being electrically displaced from said pair of primary brushes and providing with said pair of primary brushes a secondary circuit through said armature, means for controlling the secondary characteristics of said machine, and means for producing excitation in the axis of the armature reaction produced by current flowing in said primary armature circuit.

13. An armature reaction excited dynamoelectric machine having a field member and an armature member provided with a commutator having a 120° winding, three brushes including a pair of primary brushes electrically spaced apart substantially 120° and providing a primary circuit through said armature, the third of said brushes being electrically displaced from said pair of primary brushes by substantially 120° and providing with said pair of primary brushes a secondary circuit through said armature, means for controlling the secondary characteristics of said machine, and means for producing excitation in the axis of the armature reaction produced by current flowing in said primary armature circuit.

14. An armature reaction excited dynamoelectric machine having a field member and an armature member provided with a commutator, three brushes including a pair of primary brushes electrically spaced apart and providing a primary circuit through said armature, the third of said brushes being electrically displaced from said pair of primary brushes and providing with said pair of primary brushes a secondary circuit through said armature, means for controlling the secondary characteristics of said machine including a field exciting winding adapted to provide excitation in the axis of the armature reaction produced by current flowing in said secondary armature circuit, and means including another field exciting winding adapted to provide excitation in the axis of the armature reaction produced by current flowing in said primary armature circuit.

15. An armature reaction excited dynamoelectric machine having a field member with three polar projections and an armature member provided with a commutator, three brushes including a pair of primary brushes electrically spaced apart and providing a primary circuit through said armature, the third of said brushes being electrically displaced from said pair of primary brushes and providing with said pair of primary brushes a secondary circuit through said armature, means for controlling the secondary characteristics of said machine including a field exciting winding positioned on two of said polar projections and adapted to provide excitation in the axis of the armature reaction produced by current flowing in said secondary circuit, and means including another field exciting winding arranged on the third polar projection and adapted to provide excitation in the axis of the armature reaction produced by current flowing in the primary armature circuit.

16. An armature reaction excited dynamoelectric machine having a field member and an armature member provided with a commutator, three brushes including a pair of primary brushes electrically spaced apart and providing a primary circuit through said armature, the third of said brushes being electrically displaced from said pair of primary brushes and providing with said pair of primary brushes a secondary circuit through said armature, means for controlling the secondary characteristics of said machine including a field exciting winding adapted to provide excitation in the axis of the armature reaction produced by current flowing in said secondary armature circuit, means for neutralizing the armature reaction produced by the current flowing in said secondary armature circuit including a second field exciting winding energized responsive to said current, and means including a third field exciting winding energized responsive to the current in said primary armature circuit and adapted to provide excitation in the axis of the armature reaction produced by said last-mentioned current.

17. An armature reaction excited dynamoelectric machine having a field member and an armature member provided with a commutator, three brushes including a pair of primary brushes electrically spaced apart and providing a primary circuit through said armature, a low resistance connection between said primary brushes, the third of said brushes being electrically displaced from said pair of primary brushes and providing with said pair of primary brushes a secondary circuit through said armature, means for controlling the secondary characteristics of said machine including a field exciting winding adapted to provide excitation in the axis of the armature reaction produced by current flowing in said secondary armature circuit, means for neutralizing the armature reaction produced by the current flowing in said secondary armature circuit including a second field exciting winding energized responsive to said current, and means including a third field exciting winding arranged in series with said low resistance connection and energized responsive to the current in said primary armature circuit for providing excitation in the axis of the armature reaction produced by said last-mentioned current.

18. An armature reaction excited dynamoelectric machine having a field member and an armature member provided with a commutator, three brushes including a pair of primary brushes electrically spaced apart and providing a primary circuit through said armature, the third of said brushes being electrically displaced from said pair of primary brushes and providing with said pair of primary brushes a secondary circuit through said armature, means for controlling the secondary characteristics of said machine including a field exciting winding adapted to provide excitation in the axis of the armature reaction produced by current flowing in said secondary armature circuit, and means including another field exciting winding energized responsive to the current in said primary armature circuit and adapted to provide excitation in the axis of the armature reaction produced by said last-mentioned current.

19. An armature reaction excited dynamoelectric machine having a field member and an armature member provided with a commutator, three brushes including a pair of primary brushes electrically spaced apart and providing a primary circuit through said armature, a low resistance connection between said primary brushes, the third of said brushes being electrically displaced from said pair of primary brushes and providing with said pair of primary brushes a secondary circuit through said armature, means for controlling the secondary characteristics of said machine including a field exciting winding adapted to provide excitation in the axis of the armature reaction produced by current flowing in said secondary armature circuit, and means including another field exciting winding arranged in series with said low resistance connection and energized responsive to the current in said primary armature circuit for providing excitation in the axis of the armature reaction produced by said last-mentioned current.

20. An armature reaction excited dynamoelectric machine having a field member and an armature member provided with a commutator, three brushes including a pair of primary brushes electrically spaced apart and providing a primary circuit through said armature, the third of said brushes being electrically displaced from said pair of primary brushes and providing with said pair of primary brushes a secondary circuit through said armature, means for connecting said third brush and said primary brushes to a pair of secondary terminals, means for controlling the secondary characteristics of said machine including a field exciting winding adapted to provide excitation in the axis of the armature reaction produced by current flowing in said secondary armature circuit, means for neutralizing the armature reaction produced by said current flowing in said secondary armature circuit including a second field exciting winding energized responsive to said current, and means including a third field exciting winding energized responsive to the voltage across said terminals and adapted to provide excitation in the axis of the armature reaction produced by current flowing in said primary armature circuit.

21. An amature reaction excited dynamoelectric machine having a field member and an armature member provided with a commutator, three brushes including a pair of primary brushes electrically spaced apart and providing a primary circuit through said armature, the third of said brushes being electrically displaced from said pair of primary brushes and providing with said pair of primary brushes a secondary circuit through said armature, means for connecting said third brush and said primary brushes to a pair of secondary terminals, means for controlling the secondary characteristics of said machine including a field exciting winding adapted to provide excitation in the axis of the armature reaction produced by current flowing in said secondary armature circuit, means for neutralizing the armature reaction produced by said current flowing in said secondary armature circuit including a second field exciting winding energized responsive to said current, and means including a third field exciting winding arranged across said primary terminals and energized responsive to the voltage thereon for providing excitation in the axis of the armature reaction produced by the current in said primary armature circuit.

22. An armature reaction excited dynamoelectric machine having a field member and an armature member provided with a commutator, three brushes including a pair of primary brushes electrically spaced apart and providing a primary circuit through said armature, the third of said brushes being electrically displaced from said pair of primary brushes and providing with said pair of primary brushes a secondary circuit through said armature, means for connecting said third brush and said primary brushes to a pair of secondary terminals, means for controlling the secondary characteristics of said machine including a field exciting winding adapted to provide excitation in the axis of the armature reaction produced by current flowing in said secondary armature circuit, and means including another field exciting winding energized responsive to the voltage across said secondary terminals and adapted to provide excitation in the axis of the armature reaction produced by current flowing in said primary armature circuit.

23. An armature reaction excited dynamoelectric machine having a field member and an armature member provided with a commutator, three brushes including a pair of primary brushes electrically spaced apart and providing a primary circuit through said armature, the third of said brushes being electrically displaced from said pair of primary brushes and providing with said pair of primary brushes a secondary circuit through said armature, means for connecting said third brush and said primary brushes to a pair of secondary terminals, means for controlling the secondary characteristics of said machine including a field exciting winding adapted to provide excitation in the axis of the armature reaction produced by current flowing in said secondary armature circuit, and means including another field exciting winding arranged across said secondary terminals and energized responsive to the voltage thereon for providing excitation in the axis of the armature reaction produced by the current in said primary armature circuit.

ANDRÉ VALENTIN.

REFERENCES CITED

The following references are of record in the file of this patent:

UNITED STATES PATENTS

| Number | Name | Date |
|---|---|---|
| 1,014,395 | Hull | Jan. 9, 1912 |
| 2,457,014 | Valentin | Dec. 21, 1948 |
| 2,528,478 | Tryner | Oct. 31, 1950 |